(12) United States Patent
Subramanian et al.

(10) Patent No.: US 9,356,270 B2
(45) Date of Patent: May 31, 2016

(54) MULTI-TIER TRACTION BATTERY ASSEMBLY WITH ALIGNMENT FEATURE

(71) Applicant: FORD GLOBAL TECHNOLOGIES, LLC, Dearborn, MI (US)

(72) Inventors: Rajaram Subramanian, Ann Arbor, MI (US); Tommy M. Gunther, Canton, MI (US); Daniel Miller, Dearborn, MI (US); Steven Droste, Ypsilanti, MI (US); Andrew Elms, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 14/464,113

(22) Filed: Aug. 20, 2014

(65) Prior Publication Data

US 2016/0056426 A1    Feb. 25, 2016

(51) Int. Cl.
*H01M 2/10*  (2006.01)
*H01M 2/02*  (2006.01)

(52) U.S. Cl.
CPC .......... *H01M 2/1077* (2013.01); *H01M 2/0245* (2013.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 5,140,744 | A * | 8/1992 | Miller | A47B 87/00 29/730 |
| 5,709,280 | A * | 1/1998 | Beckley | H01M 2/1083 180/68.5 |
| 6,632,560 | B1 * | 10/2003 | Zhou | H01M 2/1083 180/68.5 |
| 8,642,206 | B2 | 2/2014 | Kim et al. | |
| 9,209,433 | B2 * | 12/2015 | Kukel | H01M 2/0245 |
| 2007/0264536 | A1 | 11/2007 | Mizoguchi | |
| 2009/0325060 | A1 | 12/2009 | Komaki et al. | |
| 2010/0190050 | A1 | 7/2010 | Ochi | |
| 2015/0037631 | A1 * | 2/2015 | Lee | H01M 10/6557 429/82 |
| 2015/0318585 | A1 * | 11/2015 | Morisaku | H01M 10/625 429/120 |

OTHER PUBLICATIONS

Boddakayala et al., Pending U.S. Appl. No. 14/057,273, filed Oct. 18, 2013, for Battery Assembly.

* cited by examiner

*Primary Examiner* — Jeremiah Smith
(74) *Attorney, Agent, or Firm* — David B. Kelley; Brooks Kushman P.C.

(57) ABSTRACT

A battery assembly includes a lower array including opposing endplates having upwardly protruding pins, and an upper array including opposing endplates having pin bores. The upper array includes a mid-tray defining holes positioned such that the pins are receivable in the holes and the bores when the arrays are properly oriented and such that the mid-tray blocks the pins from being received within the bores when the arrays are positioned in a reverse orientation.

20 Claims, 5 Drawing Sheets

MULTI-TIER TRACTION BATTERY ASSEMBLY WITH ALIGNMENT FEATURE

TECHNICAL FIELD

The present disclosure relates to a traction battery system for an automotive vehicle.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for the vehicle. The traction battery may include components and systems to assist in managing vehicle performance and operations. The traction battery may also include high voltage components.

SUMMARY

In one embodiment, a traction battery assembly includes a pair of cell arrays stacked one on top of the other. Each array includes opposing endplates arranged to contain cells therebetween. Each of the endplates defines a same number of locating pin receiving bores. The arrays are arranged such that the bores of one of the arrays are aligned with the bores of the other of the arrays in bore pairs. A mid-tray is disposed between the arrays and defines a number of pin pass-throughs in registration with the bore pairs. The number of pin pass-throughs is less than the number of bore pairs to orient the arrays relative to one another. At least one of the endplates of one of the arrays includes a locating pin extending away from the endplate through one of the pin pass-throughs and into one of the bores of the other of the arrays.

In another embodiment, a traction battery assembly for a vehicle includes a first cell array including endplates defining first bores and a second cell array including endplates defining second bores that align with and oppose the first bores forming a number of bore pairs. At least one of the first bores including a pin extending therefrom. A mid-tray is disposed between the arrays and defines a number of pin pass-throughs arranged such that the pin can only be received through one of the pass-throughs and into one of the second bores when the first array is correctly positioned on the second array.

In yet another embodiment, a battery assembly includes a lower array including opposing endplates having upwardly protruding pins, and an upper array including opposing endplates having pin bores. The upper array includes a mid-tray defining holes positioned such that the pins are receivable in the holes and the bores when the arrays are properly oriented and such that the mid-tray blocks the pins from being received within the bores when the arrays are positioned in a reverse orientation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
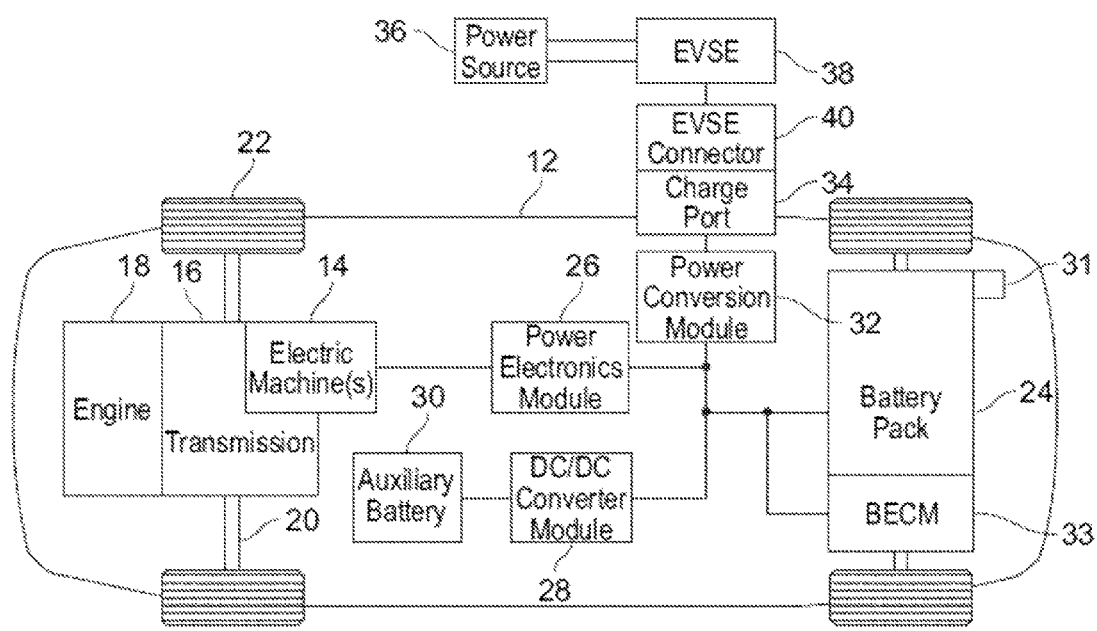
FIG. 1 depicts a schematic of a typical plug-in hybrid-electric vehicle.
Figure 2:
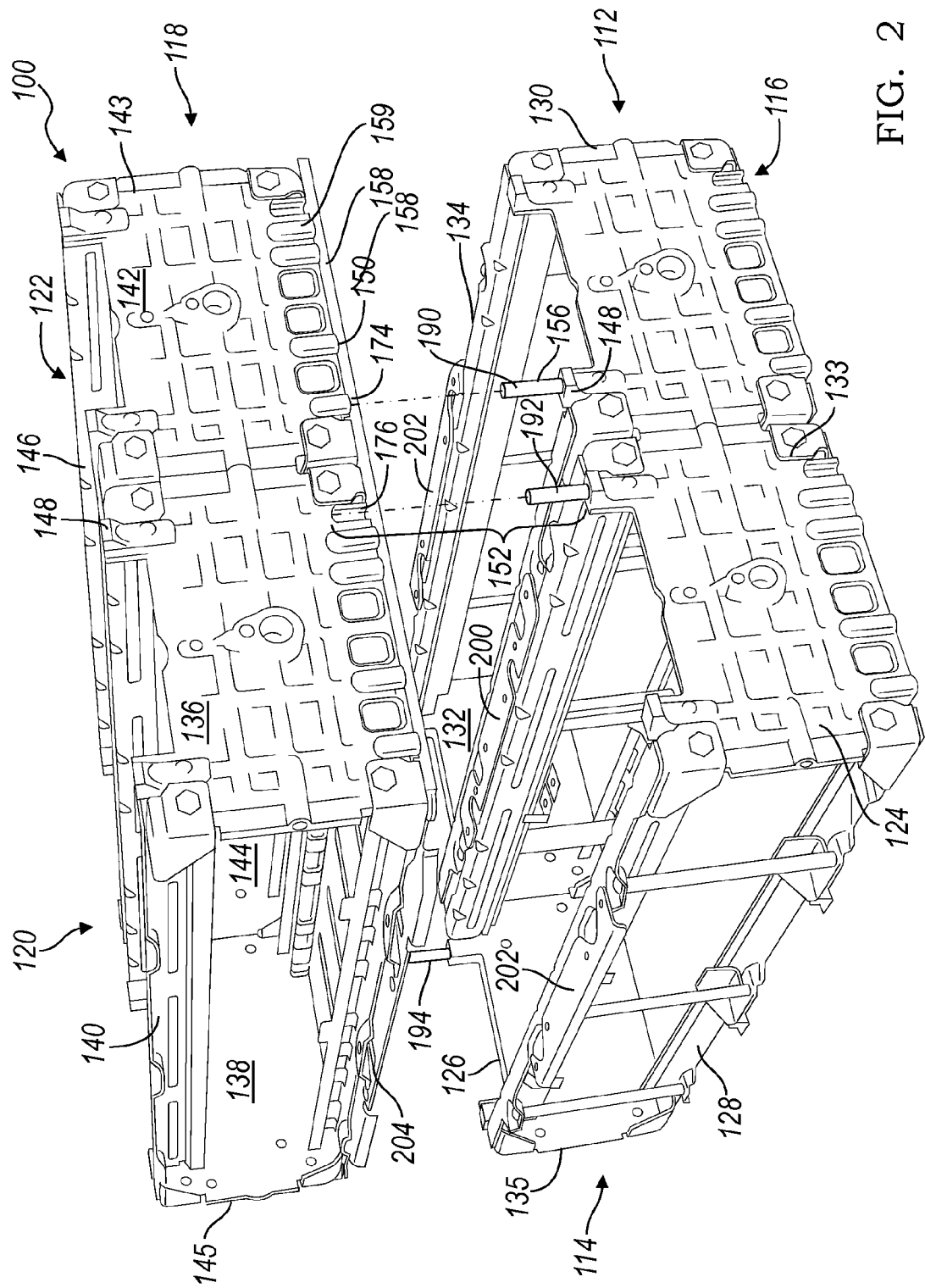
FIG. 2 illustrates an exploded view of a battery assembly.
Figure 3:
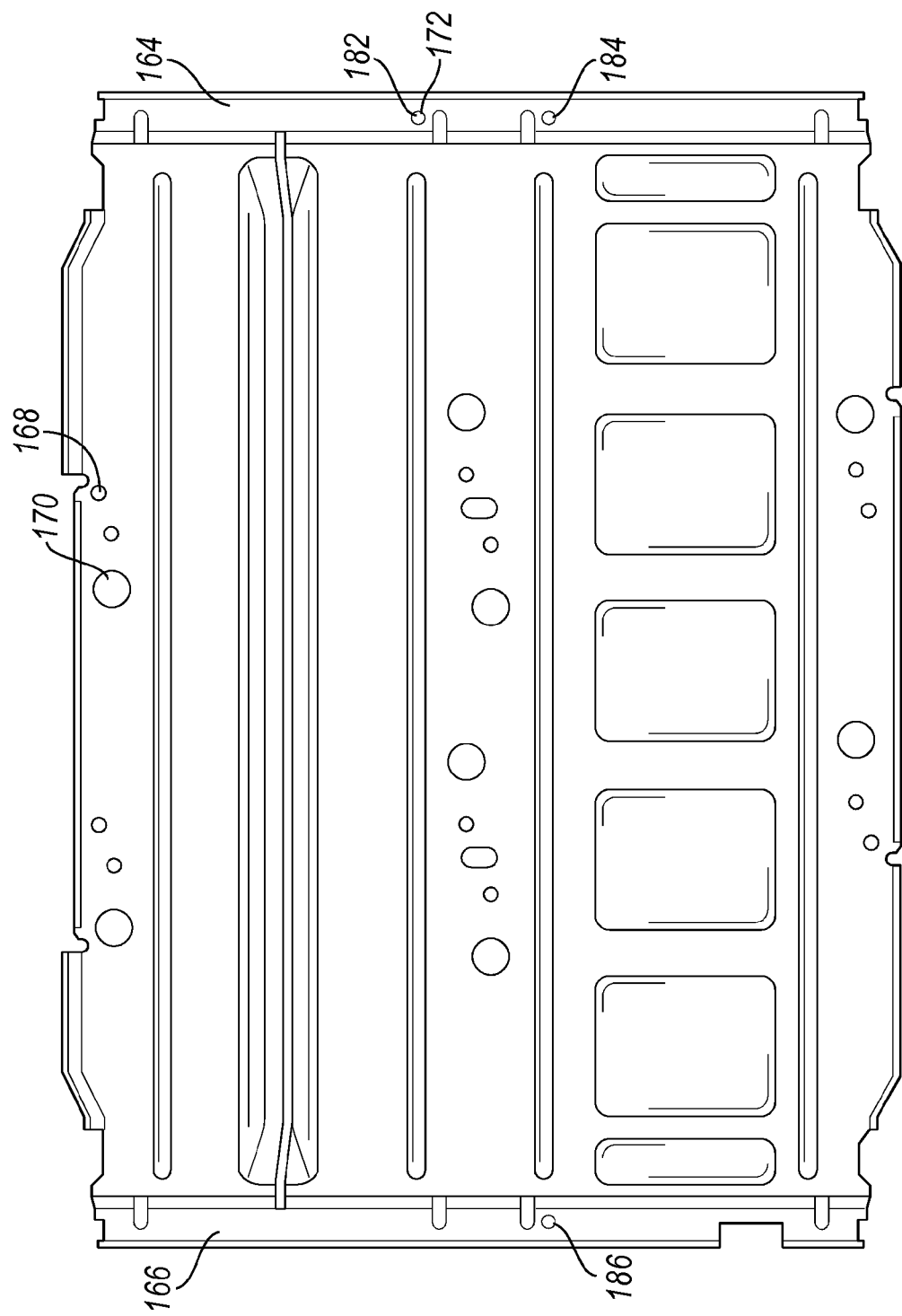
FIG. 3 illustrates a top view of a mid-tray of the battery assembly.
Figure 4:
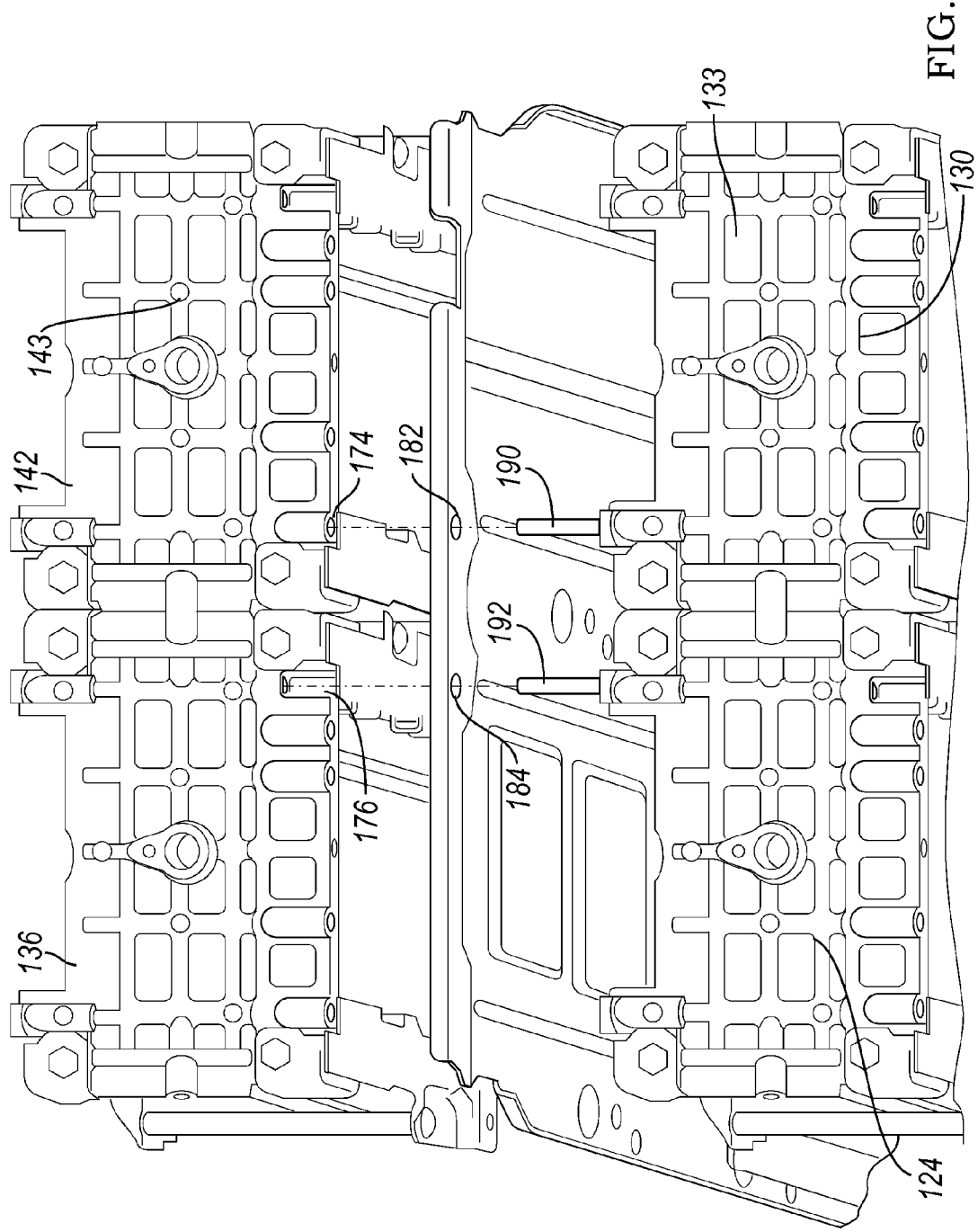
FIG. 4 illustrates a front perspective view of the battery assembly shown in FIG. 2.
Figure 5:
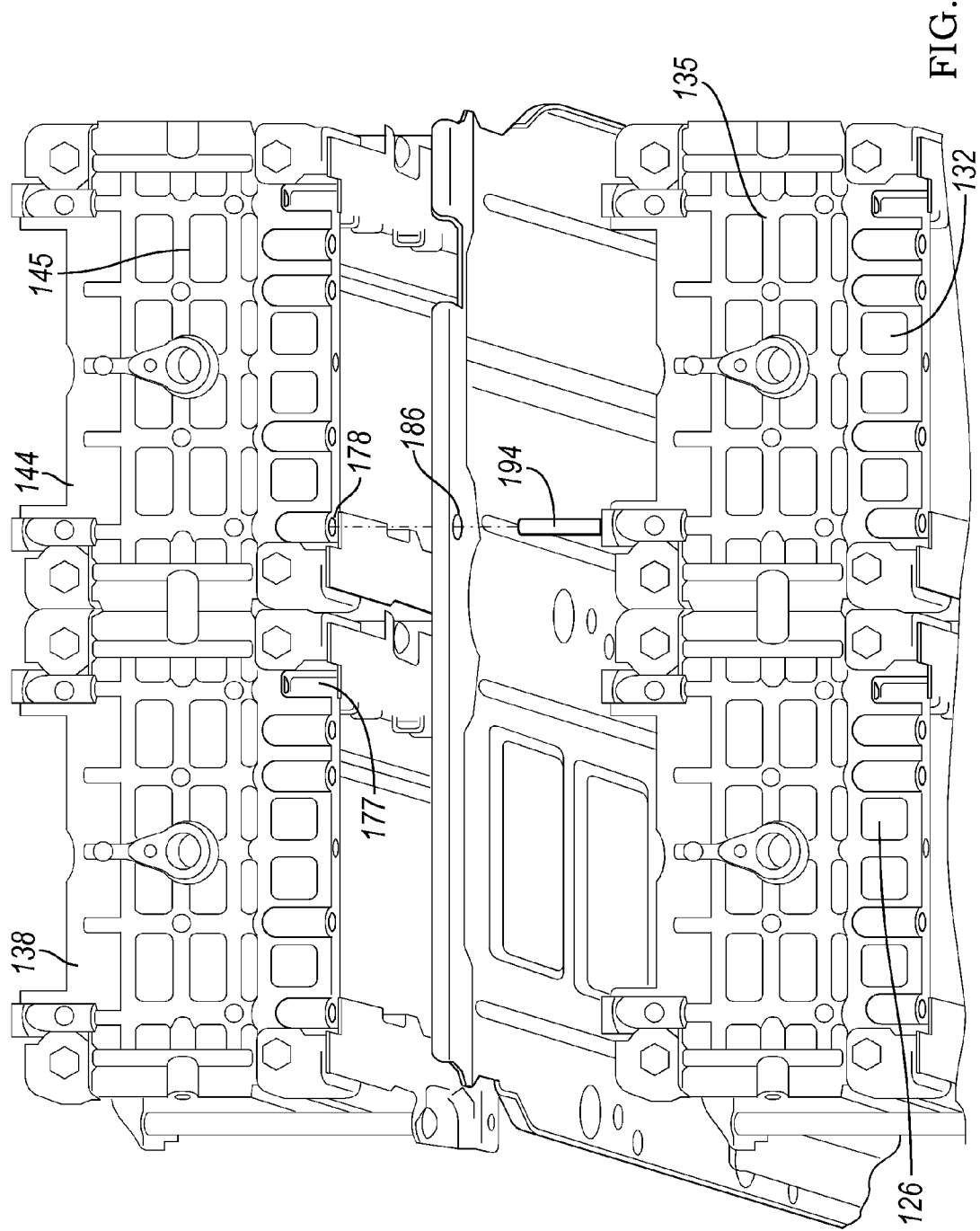
FIG. 5 illustrates a rear perspective view of the battery assembly shown in FIG. 2.

FIG. 1 depicts a schematic of a typical plug-in hybrid-electric vehicle (PHEV). The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays may include one or more battery cells.

The battery cells, such as a prismatic or pouch cell, may include electrochemical cells that convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another.

Different battery pack configurations may be available to address individual vehicle variables including packaging constraints and power requirements. The battery cells may be thermally regulated with a thermal management system. Examples of thermal management systems may include air cooling systems, liquid cooling systems and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. In a pure electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., a 12 volt battery).

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by an external power source 36. The external power source 36 is a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via dedicated electrical conduits.

FIGS. 2 through 5, and the related discussion, describe examples of the traction battery assembly 24. A battery assembly 100 may include a lower battery tier 112 having a left cell array 114 and a right cell array 116 connected together. The left array 114 may include a plurality of cells disposed between a front endplate 124 and a rear end plate 126 that are secured together by side rails 128. The right array 116 may include a plurality of cells disposed between a front endplate 130 and a rear endplate 132 that are secured together by side rails 134. Front endplate 124 may be connected to front endplate 130 and collectively define a front end 133 of the lower tier 112. Rear endplate 126 may be connected to rear endplate 132 and collectively define a rear end 135 of the lower tier 112.

The battery assembly 100 also includes an upper battery tier 118 having a left cell array 120 and a right cell array 122 connected together. The left array 120 may include a plurality of cells disposed between a front endplate 136 and a rear endplate 138 that are secured together by side rails 140. The right array 122 may include a plurality of cells disposed between a front endplate 142 and a rear endplate 144 that are secured together by side rails 146. Front endplate 136 may be connected to front endplate 142 and collectively define a front end 143 of the upper tier 118. Rear endplate 138 may be connected to rear endplate 144 and collectively define a rear end 145 of the upper tier 118.

The battery assembly 100 may include any number of upper arrays stacked on any number of lower arrays. For example, the battery assembly may include one upper array stacked on one lower array. Alternatively, the battery assembly may include three upper arrays stacked on three lower arrays.

The battery assembly 100 is correctly assembled when the front end 133 of the lower tier 112 is adjacent to the front end 143 of the upper tier 118 and when the rear end 135 of the lower tier 112 is adjacent to the rear end 145 of the upper tier 118. Thus, the left upper array 120 is disposed above the left lower array 114 with endplate 136 on top of endplate 124 and with endplate 138 on top of endplate 126. Endplate 124 and endplate 136 form a front left endplate pair. Endplate 126 and endplate 138 form a rear left endplate pair. The upper right array 122 is disposed above the lower right array 116 with endplate 142 on top of endplate 130 and with endplate 144 on top of endplate 132. Endplates 130 and 142 form a front right endplate pair. Endplate 132 and endplate 144 form a rear right endplate pair.

Each of the endplates may define a first set of locating pin receiving bores 148 at an upper portion of the endplates. Each of the endplates may also define a second set of locating pin receiving bores 150 at a lower portion of the endplates. For each endplate, the first set of bores 148 may be vertically aligned with the second set of bores 150 on that endplate so that a common endplate may be used for each array. Using common endplates simplifies manufacturing and may reduce costs and increase efficiency. The bores 148, 150 may be a blind hole defined in the endplate, may be an open slot defined an outer surface of the endplate, or may be any recess, channel or slot capable of receiving a pin, sleeve or stud therein. Each of the endplates may also include mounting bores 159 disposed at a lower end of the endplate. The mounting bores 159 may be used to attach select endplates to a mounting plate or other structure. For example the mounting bores 159 of the lower tier 112 receive a fastener for mounting the lower tier 112 to a battery assembly tray (not shown).

For each endplate pair, the second set of bores 150 on one endplate of the pair may be aligned with the first set of bores 148 on the other endplate of the pair forming bore pairs 152. Select bore pairs 152 include a locating pin 156 received within the bores of the bore pair. The pins 156 may be affixed to one of the bores of the pair and slidably connected with the other bore of the pair. For example, the pins 156 may be affixed to select bores 148 on the lower tier 112 and slidably connect with select bores 150 on the upper tier 118. Alternatively, the pins 156 may be affixed to select bores 150 on the upper tier 118 and slidably connect with select bores 148 on the lower tier 112. The pins 156 may be affixed to the select bores with a threaded connection, welding, bonding, or other attachment techniques. The pins 156 may include a sleeve portion that slidably engages with the select bores. In the illustrated embodiment, select bores 148 on the lower tier 112 include locating pins 156 that extend upwardly from the bores. Select bores 150 on the upper tier 118 receive the locating pins when the upper and lower tiers are assembled. The pins and bores cooperate to align the upper and lower tiers with each other.

Having endplates with common bore locations allows the tiers 112, 118 to be assembled in more than one orientation. The upper tier 118 will seat with the lower tier 112 in both a correct and a reverse orientation, because the bore pairs are the same for each endplate pair. For example, upper tier 118 could be assembled on the lower tier 112 in a reverse orientation with array 122 disposed on array 114 instead of the correct position with array 122 disposed on array 116. When the tiers 112, 118 are assembled in a reverse orientation, the terminals on the cells in the upper tier 118 do not align with the terminals on the cells in lower tier 112. If the terminals do not align, the busbars cannot properly connect the terminals.

A mid-tray 158 may be sandwiched between the lower tier 112 and the upper tier 118. The mid-tray 158 may be keyed so that the upper tier 118 and the lower tier 112 will only seat when positioned in correct orientation with respect to each other. The mid-tray 158 may be attached to the bottom surface of the upper tier 118. Alternatively, the mid-tray 158 may be attached to a top surface of the lower tier 112. The mid-tray 158 may include mounting holes 168 for receiving fasteners to mount the mid-tray 158 to the side rails of the upper arrays 120, 122. The mid-tray 158 may be mounted to the upper tier 118 with a front edge portion 164 adjacent to the bottom surfaces of front upper endplates 136, 142 and with a rear edge portion 166 adjacent to the bottom surfaces of rear upper endplates 138, 144. The mid-tray 158 may also include access holes 170 to provide tool clearances for fastening the lower tier 112 to the upper tier 118.

The edge portions 164, 166 define a plurality of pin pass-throughs 172 that provide an opening completely through the mid-tray 158. The pin pass-throughs 172 may be a hole, aperture, slot or other opening through the mid-tray 158 that is capable of receiving a pin therethrough. The pin pass-throughs 172 are positioned to align with select bore pairs 152. The number of the pin pass-throughs 172 may be less than the number of bore pairs 152. Thus, some of the bores 150 in the upper tier 118 are covered by the mid-tray 158. By providing a less number of pin pass-throughs than bore pairs 152, the mid-tray is keyed to only allow the upper tier 118 to seat with the lower tier 112 in one orientation. The location and number of the pins pass-throughs correspond with the location and number of the locating pins 156.

In the illustrated embodiment, the battery assembly 100 includes eight bore pairs 152, three pin pass-throughs 172 and three locating pins 156. The front end 133 of the lower tier 112 may include a first locating pin 190 and a second locating pin 192. The mid-tray 158 may include two pin pass-throughs 182, 184 defined in the front edge portion 164. The pin pass-throughs 182, 184 may be positioned to align with respective bores 174, 176 and respective locating pins 190, 192.

The rear end 135 of the lower tier 112 may include a locating pin 194. The mid-tray 158 may include a pin pass-through 186 defined in the rear edge portion 166. The pin pass-through 186 may be positioned to align with bore 178 and locating pin 194. When assembled in correct orientation, the locating pin 190 extends through pin pass-through 182 and is received within the bore 174. Locating pin 192 extends through pin pass-through 184 and is received within bore 176. Locating pin 194 extends through pin pass-through 186 and is received within bore 178. The keyed mid-tray 158 prevents the battery assembly 100 form being assembled in reverse orientation. The rear end 145 of the upper tier 118 cannot be seated with the front end 133 of the lower tier 112 because bore 177 is covered by the mid-tray and prevents locating pin 192 from being received within bore 177. In alternative embodiments, the number of pins, pin pass-throughs and bore pairs may be increased or decreased.

After the upper and lower tier 112, 118 are aligned on each other, the tiers are secured together. The attachment scheme includes a lower tier attachment having a top middle bracket 200 connecting the two arrays and mounted to a top surface of the lower tier 112. The attachment scheme includes a pair of side brackets 202 each mounted to respective side rails 134, 128. As shown, the lower tier attachment includes one top middle bracket 200 at least two side brackets 202. However, if the lower battery tier 112 included a different number of lower battery arrays, additional middle brackets 200 may be provided.

The mid-tray 158 includes upper attachment portions 204. The upper attachment portions 204 mount to the side brackets 202. Fasteners are received through the upper attachment portions and the side brackets 202 to secure the upper tier 118 to the lower tier 112. The mid-tray 158 also includes upper middle attachment portions (not shown) that mount to the middle bracket 200.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery assembly comprising:
   a pair of cell arrays stacked one on top of the other, each array including opposing endplates arranged to contain cells therebetween, each of the endplates defining a same number of locating pin receiving bores, and the arrays being arranged such that the bores of one of the arrays are aligned with the bores of the other of the arrays in bore pairs; and
   a mid-tray disposed between the arrays and defining a number of pin pass-throughs in registration with the bore pairs, the number of pin pass-throughs being less than the number of bore pairs to orient the arrays relative to one another, and at least one of the endplates of one of the arrays including a locating pin extending away from the endplate through one of the pin pass-throughs and into one of the bores of the other of the arrays.

2. The traction battery of claim 1 wherein the mid-tray includes a first end and a second end and wherein the first end includes a greater number of pin pass-throughs than the second end.

3. The traction battery of claim 1 wherein each locating pin is threadably connected to only one of the endplates.

4. The traction battery of claim 1 wherein the mid-tray further defines mounting holes configured to receive fasteners for securing the mid-tray to one of the arrays.

5. The traction battery of claim 1 wherein at least one of the locating pin receiving bores is a blind hole.

6. The traction battery of claim 1 wherein at least one of the locating pin receiving bores is an open slot defined in an outer surface of a corresponding endplate.

7. A traction battery assembly for a vehicle comprising:
a first cell array including endplates defining first bores;
a second cell array including endplates defining second bores that align with and oppose the first bores forming a number of bore pairs, and at least one of the first bores including a pin extending therefrom; and
a mid-tray between the arrays and defining a number of pin pass-throughs arranged such that the pin can only be received through one of the pass-throughs and into one of the second bores when the first array is correctly positioned on the second array.

8. The traction battery of claim 7 wherein the number of pin pass-throughs is less than the number of bore pairs to prevent incorrect assembly of the arrays.

9. The traction battery of claim 7 wherein the first array further includes a front endplate and a rear end plate, wherein the second array further includes a front end plate and a rear endplate, wherein the front endplate of the second array is disposed on top of the front endplate of the first array forming a front array pair, and wherein the rear endplate of the second array is disposed on top of the rear endplate of the first array forming a rear array pair.

10. The traction battery of claim 9 wherein the number of bore pairs in the front array pair is equal to the number of bore pairs in the rear array pair.

11. The traction battery of claim 9 wherein two of the bore pairs of the front array pair include a pin and one of the bore pairs of the rear array pair include a pin.

12. The traction battery of claim 11 wherein the mid-plate includes a front edge portion disposed between the front array pair and wherein the front edge portion includes two pin-pass throughs aligned with the two bore pairs that include a pin.

13. The traction battery of claim 12 wherein the mid-plate includes a rear edge portion disposed between the rear array pair and wherein the rear edge portion includes one pin pass-through aligned with the one bore pair that includes a pin.

14. The traction battery of claim 7 wherein the mid-tray further defines mounting holes configured to receive fasteners for securing the mid-tray to one of the arrays.

15. The traction battery of claim 14 wherein the mid-tray is attached to the second array.

16. The traction battery of claim 15 wherein the pin includes a first end affixed to one of the first bores and a second end slidably engaged with one of the second bores.

17. The traction battery of claim 7 wherein at least one of the second bores is a blind hole.

18. The traction battery of claim 7 wherein at least one of the second bores is an open slot defined in an outer surface of a corresponding endplate.

19. A traction battery assembly comprising:
a lower array including opposing endplates having upwardly protruding pins; and
an upper array including opposing endplates having pin bores, the upper array including a mid-tray defining holes positioned such that the pins are receivable in the holes and the bores when the arrays are properly oriented and such that the mid-tray blocks the pins from being received within the bores when the arrays are positioned in a reverse orientation.

20. The traction battery assembly of claim 19 wherein the mid-tray further includes opposing ends disposed adjacent to the opposing endplates of the upper array and wherein the holes are positioned at the opposing ends of the mid-tray with one end of the mid-tray including a greater number of holes than the other end of the mid-tray.

\* \* \* \* \*